UNITED STATES PATENT OFFICE.

JOHN H. STRINGHAM, OF JERSEY CITY, NEW JERSEY, ASSIGNOR, BY MESNE ASSIGNMENTS, TO THE WESTINGHOUSE MACHINE COMPANY, A CORPORATION OF PENNSYLVANIA.

GAS-GENERATING APPARATUS.

935,429.  Specification of Letters Patent.  Patented Sept. 28, 1909.

Application filed October 6, 1902, Serial No. 126,167. Renewed December 19, 1908. Serial No. 185,899.

*To all whom it may concern:*

Be it known that I, JOHN H. STRINGHAM, a citizen of the United States, residing in Jersey City, New Jersey, have invented certain Improvements in Gas-Generating Apparatus, of which the following is a specification.

My invention consists of apparatus for generating gas for heating or lighting purposes or for use in motive power engines, the apparatus being intended especially for domestic use or for employment in small manufacturing establishments where a limited amount of power only is required, and said apparatus being so constructed as to require but little attention and no special skill in its operation.

Figure 1:
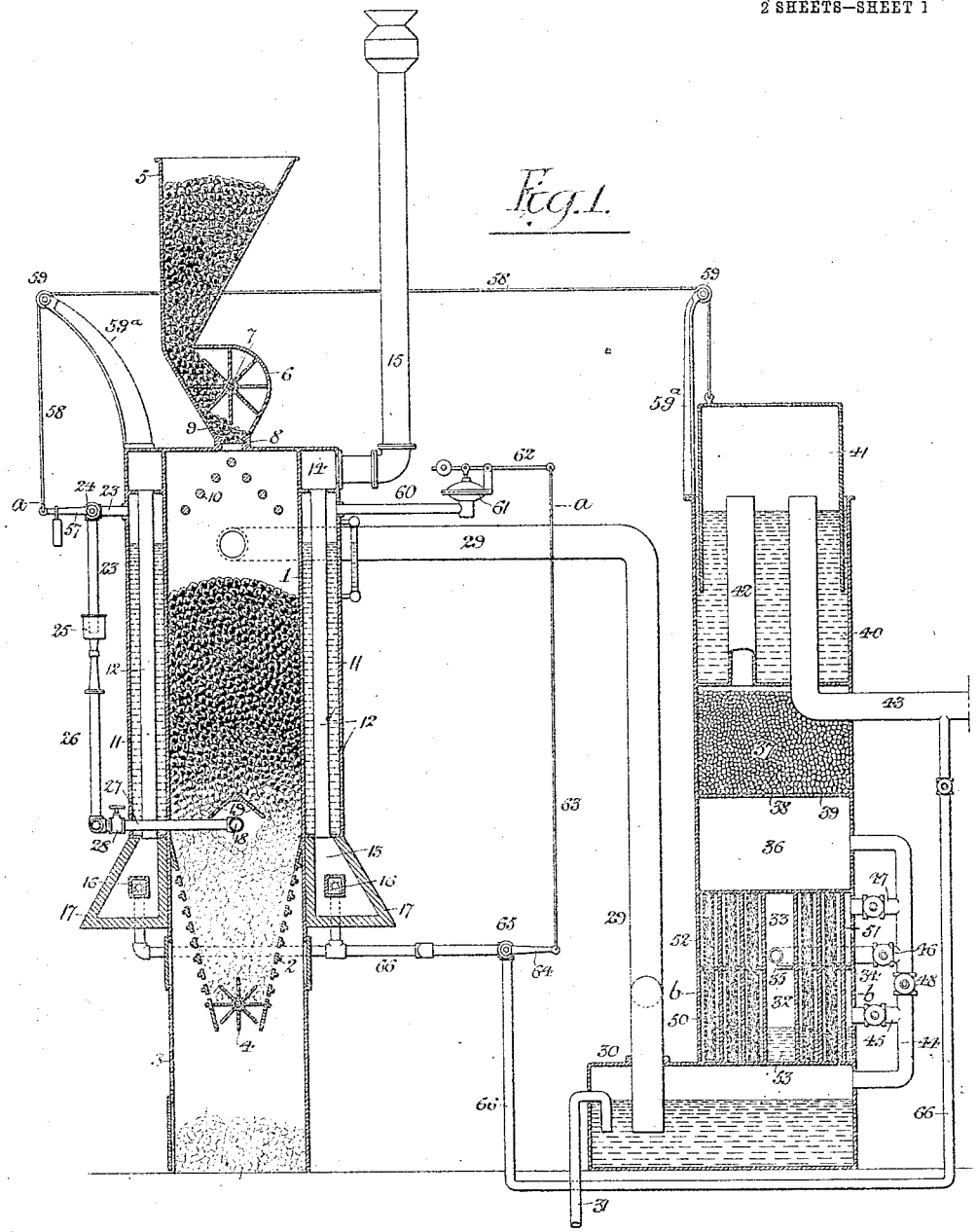
Figure 2:
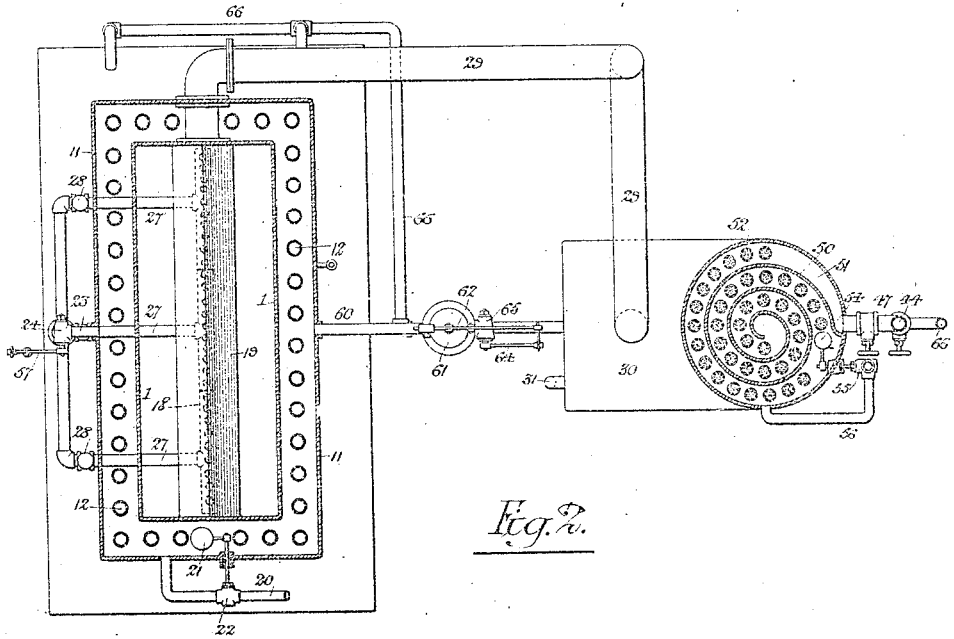
Figure 3:
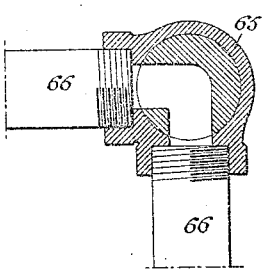

In the accompanying drawings: Figure 1, is a view partly in side elevation and partly in section of gas generating apparatus constructed in accordance with my invention; Fig. 2, is a view of the same partly in plan, but with the generator shown in section on the line *a—a* and the carbureter shown in section on the line *b—b;* and Fig. 3, is an enlarged section of one of the valves of the apparatus.

My invention consists of a generator for producing carbon monoxid or as it is usually termed "producer gas" by forcing a blast of steam and air through a body of ignited coal, this generator being combined (or not as desired) with a carbureter for enriching the gas so that the latter may be used for domestic lighting purposes or for use in gas engines in establishments where power is required, the gas producer having a water jacket constituting a steam generator whereby the waste heat of the gas producer is caused to provide steam for use in the blast. Provision is also made for utilizing a portion of the generated gas for maintaining the heat of the jacket when the waste heat is insufficient, the apparatus having been designed with the view of rendering it as nearly automatic as possible, so that no skilled attendant will be required to operate it and it can therefore be used as a domestic heat and light plant or as a heat, light, and power plant in small manufacturing establishments where skilled attendants are not available or where it is not desired to incur the expense of the same.

Referring to the drawings, 1, represents the gas producer casing which may be of any suitable material, size, and shape, but which is preferably composed of sheet metal and is of oblong rectangular form, as shown in Fig. 2.

The producer has a grated and tapering ash hopper 2 contained within a downward extension 3 of the producer casing 1 and this hopper has, at the bottom, a vaned drum 4 or other equivalent ash discharging device, by the rotation of which ashes will be delivered from the lower portion of the ash hopper 2 into the ash pit contained within the downward extension 3 of the producer casing.

At the top of the producer casing is a fuel hopper 5 which communicates with a casing 6 containing a vaned drum 7, said casing 6 also communicating, through a contracted neck 8, with the interior of the producer casing, hence, by proper rotation of the drum 7, coal in measured quantity can be withdrawn from the hopper 5 and fed into the producer. The neck 8 is, by preference, provided with a sliding valve 9 so that any escape of gas upwardly through said neck can be prevented during the intervals between the successive feeding operations.

In the upper portion of the gas producer is a grated fuel distributer consisting of a series of longitudinal rods 10 disposed so as to form a grate with opposite inclined sides, the apex of this grate being directly below the center of the contracted neck 8, whereby fuel passing through the latter will fall upon the grate and will be deflected to right and left down the inclined sides of the same, portions of this fuel passing downwardly between the bars of the grate and the remaining portions being discharged from the lower ends of the grate so as to effect a uniform distribution of the fuel throughout the area of the producer.

Surrounding the producer casing 1 is another casing 11 and in the space between these two casings is arranged a series of vertical tubes 12 which communicate at their lower ends with a combustion chamber 13 and at their upper ends with a discharge chamber 14, said discharge chamber having an outlet pipe or stack 15 and the combustion chamber having therein a gas burner 16 and being provided with a casing 17 composed of or lined with fire-brick or other refractory material so that it will not be injured by the heat maintained in said combustion chamber.

Within the lower portion of the producer is a blast pipe 18 having openings in the top of the same, this pipe being surmounted by a hood or deflector 19 having inclined sides so as to laterally deflect the body of ashes passing downwardly through the producer and prevent said ashes from gaining access to the blast pipe, the blast from the latter passing outwardly and upwardly around the lower edges of the hood or deflector and rising first through the ashes and then through the mass of incandescent fuel in the producer, as is customary in ordinary fuel gas producers.

The space between the gas producer casing 1 and the outer casing 11 is filled to a predetermined level with water derived from a supply pipe 20, a constant level being maintained by means of a float 21 (Fig. 2) which, by means of a connection such as shown operates a valve 22 in the supply pipe, steam being generated by reason of the vaporization of this water by the heat of the producer casing 1, reinforced, if need be, by heated gases from the burner 16, which gases rise from the combustion chamber 13 through the tubes 12.

A pipe 23 communicates with the steam space of the steam generator, this pipe having a valve 24 which controls the flow of steam through the pipe 23 to a blower 25 of any suitable construction whereby the steam is mixed with air for supplying the blast pipe 18. In the present instance the blower pipe 26 has three branches 27, one communicating with the longitudinal central portion of the blast pipe 18 and the others communicating with said blast pipe at points between the center and ends of the same, each of said branches 27 having a valve 28 whereby the flow of air and steam through the same can be regulated independently of the flow through the other branches. The pipe 18 has no internal partition, but I have found in practice that by cutting off the flow through any of the branches 27, the blast from that portion of the pipe 18 corresponding to said branch will be materially weakened. The action of the blast upon the mass of fuel in the producer casing 1 can thereby be readily governed in accordance with the desired conditions of combustion in different portions of said mass. The gas escapes from the producer 1 through a down-take pipe 29 the lower end of which terminates some distance below the level of the water in a wash box 30 in which the desired level of water is maintained by means of a trapped drain pipe 31. The gas passes from the wash box into a structure surmounting said box and combining the functions of a carbureter, a purifier, and a holder for the gas. The lower portion of this structure constitutes the carbureter and contains two chambers 32 and 33 separated from each other by a horizontal partition 34 except as to the central portions of the chambers which communicate with each other through a central opening 35 in said partition.

Above the carbureting chambers is a gas receiving chamber 36 and above the latter is a purifying chamber 37 containing charcoal or other purifying agent, this chamber communicating with the chamber 36 through a central opening 38 in the partition 39 which is interposed between said chambers. Above the purifying chamber 37 is a water vessel 40 and an inverted bell 41 constituting a gas holder, the purified gas from the chamber 37 entering said bell through a pipe 42 and the gas being delivered from the bell through a pipe 43 whereby it is conveyed to the point or points at which it is to be used. Extending from the gas chamber of the wash box 30 to the chamber 36 is a pipe 44 having three valved branches 45, 46 and 47, the branch 45 communicating with the outer portion of the carbureting chamber 32 and the branches 46 and 47 communicating respectively with the central and outer portions of the carbureting chamber 33, and, in the pipe 44, between the branches 45 and 46, is a valve 48. Each of the carbureting chambers 32 and 33 has a spiral partition 50 whereby there is formed in each of said chambers a spiral passage 51 extending from the outer portion of the chamber to the center of the same and the spiral passage of each carbureting chamber contains a number of tubes 52 of wire gauze, perforated sheet metal, or other openwork material, each of these tubes containing a mass of mineral wool, asbestos, or other absorbent material, the lower portion of each tube being contained within a body of naphtha or other hydrocarbon 53 in the lower portion of the carbureting chamber 32, a normal level of such hydrocarbon being maintained by means of a float 54 (Fig. 2) which actuates a valve 55 in the hydrocarbon supply pipe 56. By this means uniform saturation of the absorbent contents of the tubes 52 is insured, hence said tubes have a constant carbureting value and in order to effect a greater or less enrichment of the gas the same may, by manipulation of the valves in the pipe 44 and its branches, be caused to pass either through both of the carbureting chambers 32 and 33 or only through the lower carbureting chamber as desired; for instance, when the valve 48 in the pipe 44 and the valve in the branch 46 are closed and the valves in the branches 45 and 47 are open, the gas is caused to travel first through the spiral chamber 51 of the carbureting chamber 32 from the outer portion to the center of said chamber and is then caused to traverse in reverse direction the spiral passage of the carbureting chamber 33, escaping from the outer portion of said chamber through the branch 47. If, however, the valve 48 in the pipe 44 and the valve in the branch 47 are closed, the valves in the branches 45 and 46 being open, the gas after passing through the spiral passage of the carbureting chamber 32 will escape directly from the center of the carbureting chamber 33 to the branch 46 and hence will not be as highly carbureted as though it had passed through the spiral passages of both carbureting chambers.

In order to regulate the generation of gas to accord with the rate at which the gas is being consumed, the valve 24 in the pipe 23 has a weighted arm 57 which is connected to one end of a cord, chain, or other flexible connection 58, the opposite end of which is connected to the bell 41 of the gas holder, the cord passing over pulleys 59 mounted upon suitable brackets 59ª so that as the bell 41 rises the weighted arm 57 will fall and close the valve 24 while falling movement of the bell 41 causes an elevation of the arm 57 and an opening of the valve 24, hence, when sufficient gas has been generated to raise the bell to a predetermined height, the blast will be cut off from the pipe 18 and the generation of gas in the producer will be arrested, such generation being resumed, however, as soon as sufficient gas has been withdrawn from the bell 41 to permit such descent of the same as will again open the valve 24. In like manner, the supply of gas to the burner 16 is regulated by the pressure of steam maintained in the steam generator 11, the means for accomplishing this result being as follows: A pipe 60 leading from the steam chamber of the generator 11 communicates with a pressure device 61 similar to that of an ordinary damper regulator, the weighted lever 62 of said device being connected by a rod 63 to an arm 64 on a valve 65 which is interposed in a pipe 66 leading from the gas delivery pipe 43 to the burner 16, said valve being so constructed (as shown in Fig. 3) that when the pressure in the steam generator is sufficient to lift the weighted lever 62 the flow of gas through the pipe 66 will be almost entirely cut off, hence only a small igniting flame will be maintained at the burner 16. If, however, the pressure of steam in the generator 11 falls below a predetermined limit the weighted lever 62 will act upon the valve 65 so as to open the same and permit such flow of gas into the burner 16 as will supply to the generator 11 sufficient additional heat to raise the pressure of steam therein to the desired limit.

The automatic features of the entire gas generating apparatus coöperate as follows. In normal operation, a considerable quantity of gas may be drawn off through the pipe 43 for use in a desired manner. When the amount drawn off is varied, the resulting change of pressure in the holder 40 will regulate the valve 24 to permit more or less steam to flow from the steam generator into the pipe 23, thus causing more or less air to be drawn into the blower 25, and supplying more or less oxygen to the fuel, thus causing the generation of more or less gas to correspond with the varying demand upon the holder. This variation of the steam drawn from the steam generator regulates the valve 22 (Fig. 2) to permit more or less water to flow into the steam generator, in proportion to the amount of steam drawn off through the pipe 23, thus maintaining a substantially constant body of water to be heated. The operation of the device 21 is thus dependent upon the quantity of steam permitted by the device 41, 57 to flow through the pipe 23. The steam pressure in the steam generator may be normally quite low, and therefore the water may be supplied under ordinary city pressure. The variation of the steam pressure in the steam generator also regulates the valve 65, to permit more or less gas to flow to the burner 16, thus maintaining the water at the proper temperature to generate the required amount of steam. The operation of the device 61 is thus dependent upon the quantity of steam permitted by the device 41, 57, to flow through the pipe 23. When the use of gas from the holder is discontinued for a period, the generation of a large amount of gas is discontinued, but neither the combustion in the fuel bed nor the gas burner flame is extinguished, because the pipe 66 is connected with the holder, instead of directly with the gas generator, and because this pipe 66 is maintained in communication with the holder, the valve 65 being partially open even when moved as far as possible by the device 61, thus always insuring at least a small supply of gas to the burner 16. Thus a small quantity of gas may be generated, to compensate for the small supply to the burner, and during this period the operation of the automatic features is similar, to that described above. During this period the valve 65 may open at times to a considerable extent, because the fire bed may not be hot enough to keep up the steam pressure. Hence the holder is kept filled, the steam pressure is kept up, the water level is maintained, and the fire is kept alive, until it is again desired to draw off gas from the holder for external use, which can be again begun without any delay. Thereupon, the valve 24 will be opened wider, and, since the fuel bed may not be sufficiently hot, the valve 65 may open much wider to keep up the steam pressure until such pressure may be maintained by the fire alone or by the fire with a smaller opening of the valve 65.

Having thus described my invention, I claim and desire to secure by Letters Patent:—

1. The combination in gas generating apparatus, of a producer casing, a perforated blast pipe therein, and a series of independently valved branches for conveying the blast to said pipe, said branches being disposed at intervals throughout the length of the pipe whereby the blast to different portions of the pipe can be independently controlled, substantially as specified.

2. The combination in gas generating apparatus, of a producer casing having a water jacket constituting a steam generator, tubes in said water jacket, and a gas burner for supplying products of combustion to said tubes.

3. In a gas generating apparatus, the combination of a gas generating chamber, a blast pipe therefor, a series of independently valved branches for conveying blast to said chamber whereby the blast to the different parts of the chamber can be independently controlled.

4. In a gas generating apparatus, the combination of a gas generating chamber provided with a water jacket, tubes within said jacket and a gas burner for supplying products of combustion to said tubes.

5. In a gas generating apparatus, the combination of a gas generating chamber provided with a water jacket, tubes within said jacket and means for supplying a regulable quantity of the products of combustion to said tubes.

6. In a gas generating apparatus, the combination of a gas generating chamber, a blast pipe therefor, a series of independently valved branches for conveying blast to said chamber whereby the blast to the different parts of the chamber can be independently controlled, and means common to all of said branches and dependent upon the pressure of the gas generated in said chamber for controlling the delivery of the blast through said pipe.

7. In a gas generating apparatus, the combination of a gas generating chamber provided with a water jacket, tubes located within said water jacket, a gas burner for supplying heat to said tubes and means, dependent upon the pressure generated within said jacket, for controlling the delivery of gas to said burner.

8. In a gas generating apparatus, a gas producer, a steam boiler arranged to derive heat from the said producer, a fuel bed blast arranged to derive steam from the said boiler, a supplemental heating agent for the boiler, the operation of which is dependent upon the pressure within the boiler, and means dependent upon the gas pressure for controlling said fuel bed blast.

9. In a gas generating apparatus, a gas producer, a steam boiler arranged to derive heat therefrom, a steam and air fuel bed blast connected to said boiler, an agent dependent upon the gas pressure at the outlet of the apparatus for controlling the steam entering said blast, and means dependent on the amount of steam entering said blast whereby the proportions of air and steam are maintained substantially constant under varying volumes of steam supply.

10. In a gas generating apparatus, a gas producer, a steam boiler arranged to derive heat from said producer, an automatically controlled water supply for said boiler, a steam and air fuel bed blast for the producer, means whereby said blast is controlled by the gas pressure at the outlet of the apparatus, and independent heating means for said boiler operatively dependent upon the pressure within said boiler.

11. In a gas generating apparatus, a gas producer, a steam boiler arranged to derive heat from said producer, a steam and air fuel bed blast and agents whereby the amount of steam supplied to said blast is controlled by the gas pressure at the outlet of the apparatus and the amount of air supplied thereto is controlled by the volume of steam component of said blast.

12. In a gas generating apparatus, the combination with a gas producer, of a steam generator, a fuel bed blast connected thereto, an agent having a movable element subject to the pressure of the gas produced, means controlled by said movable element for regulating said blast, a burner receiving gas from the producer for heating the steam generator independent of the sensible heat of the gas generated, and means dependent upon the steam pressure within the steam generator for regulating the supply of gas to the burner, a water supply pipe for the steam generator and means dependent upon the water level in the steam generator for controlling the flow through the water supply pipe.

13. In a gas generating apparatus, the combination with a gas producer, of a steam generator, means for supplying steam from said generator to the producer, means dependent upon the water level in the steam generator for supplying water thereto, independent means exterior to said gas producer and dependent upon the pressure in said steam generator for supplying heat to said generator and means dependent upon the volume of the generated gas for controlling the steam supplied to said producer.

In testimony whereof, I have signed my name to this specification, in the presence of two subscribing witnesses.

JOHN H. STRINGHAM.

Witnesses:
F. E. BECHTOLD,
Jos. H. KLEIN.